E. R. DRAVER.
CARRIER FOR DEMOUNTABLE RIMS.
APPLICATION FILED NOV. 19, 1917.
1,322,679.
Patented Nov. 25, 1919.
3 SHEETS—SHEET 2.
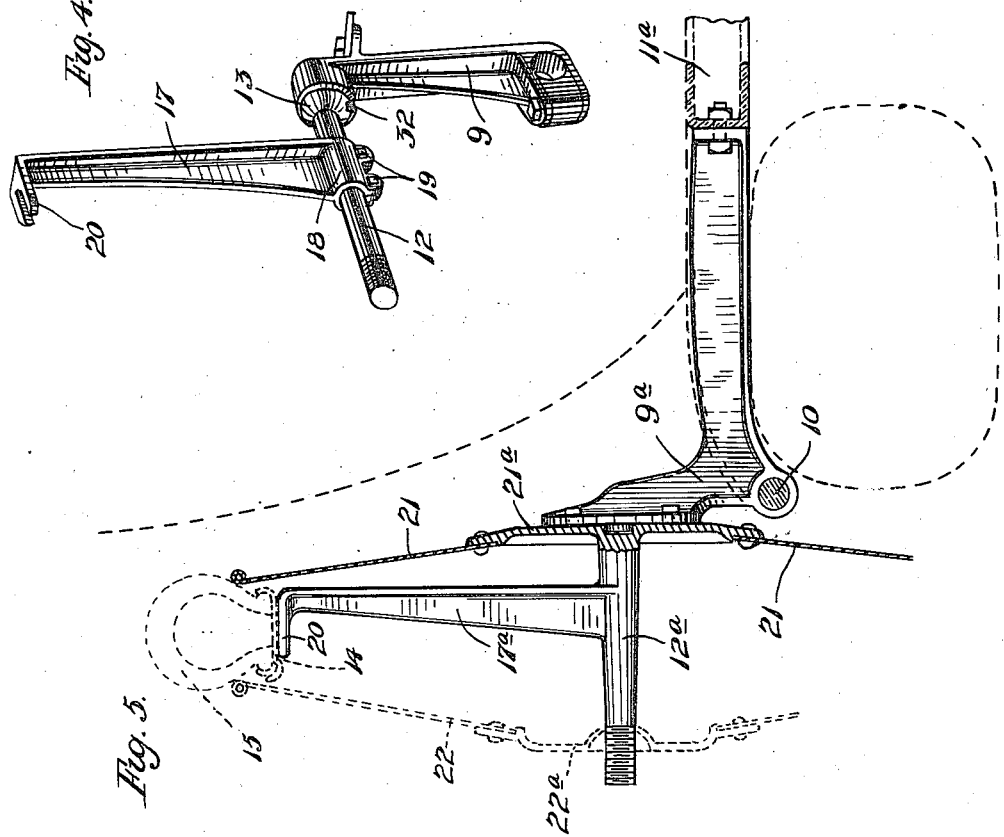
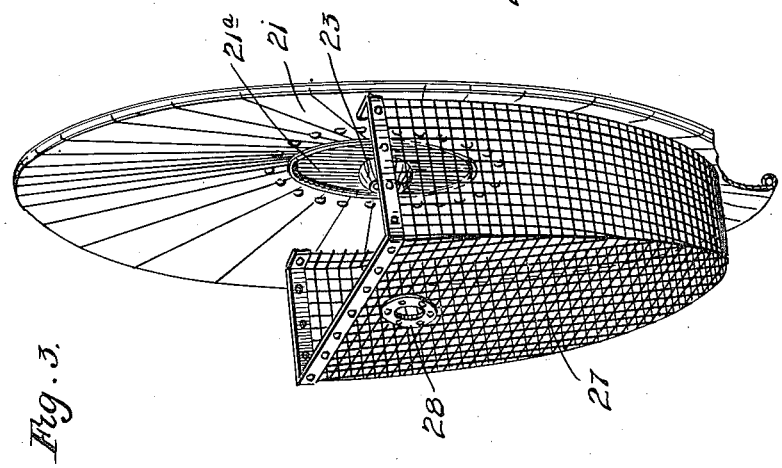
Witnesses
H. L. Opsahl.
E. C. Wells
Inventor
E. R. DRAVER
By his Attorneys

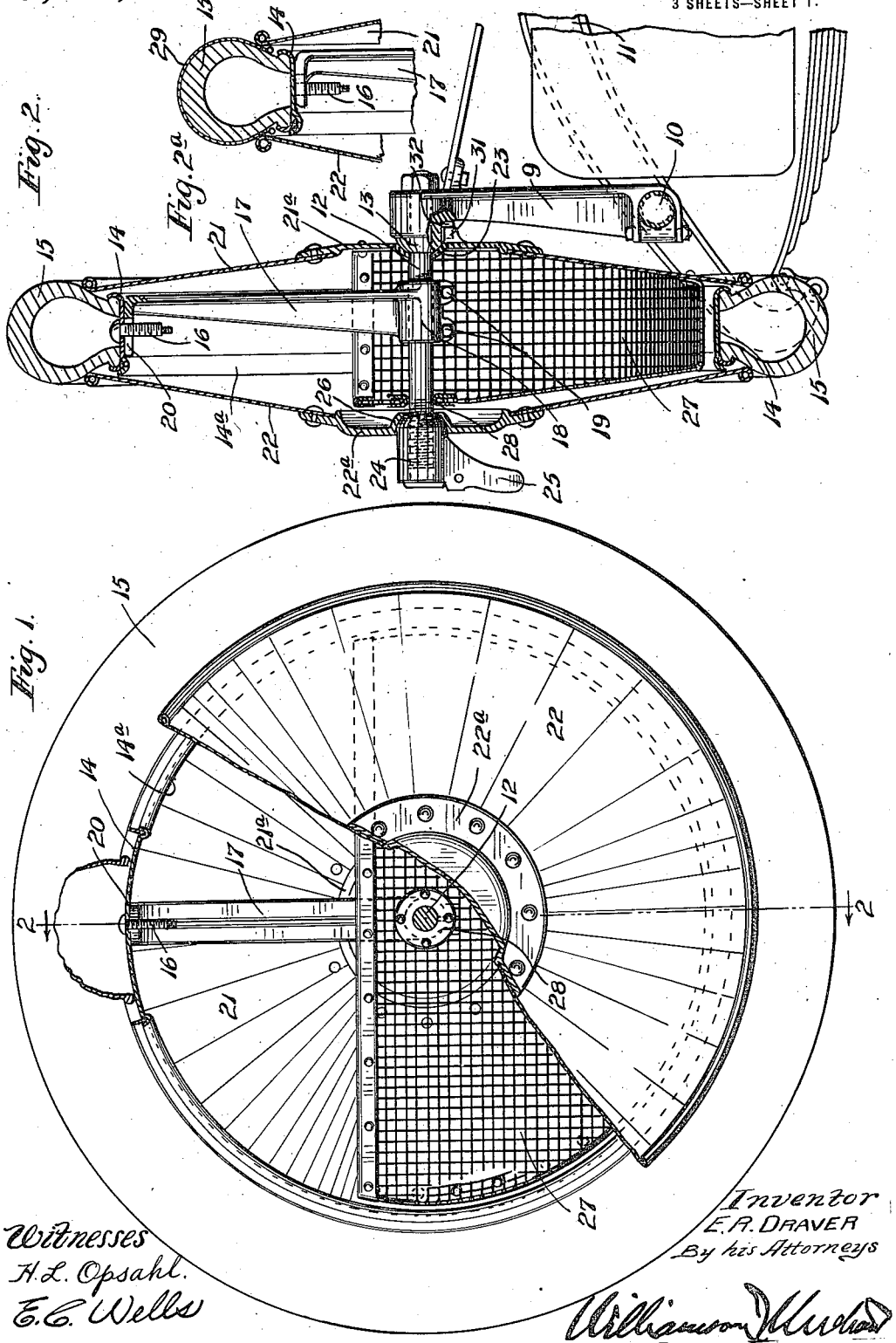

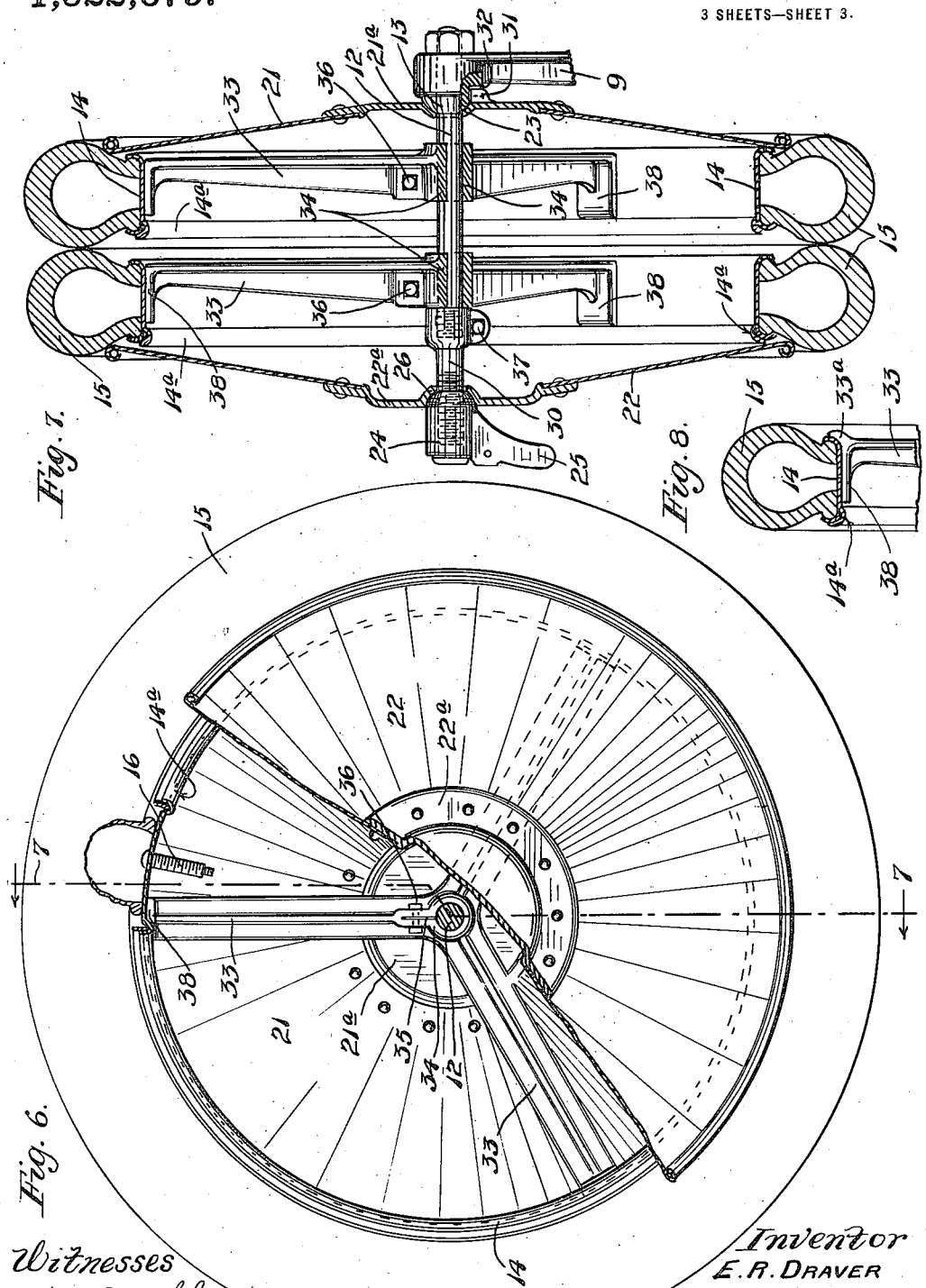

UNITED STATES PATENT OFFICE.

EMIL R. DRAVER, OF RICHMOND, INDIANA.

CARRIER FOR DEMOUNTABLE RIMS.

1,322,679.

Specification of Letters Patent. Patented Nov. 25, 1919.

Application filed November 19, 1917. Serial No. 202,716.

*To all whom it may concern:*

Be it known that I, EMIL R. DRAVER, a citizen of the United States, residing at Richmond, in the county of Wayne and State of Indiana, have invented certain new and useful Improvements in Carriers for Demountable Rims; and I do hereby declare the following to be a full, clear, and exact description of the invention, such as will enable others skilled in the art to which it appertains to make and use the same.

My invention has for its object to provide, as an attachment for automobiles, an improved carrier for demountable rims, whether or not the rims are equipped with tires. As an important feature of the invention, the carrier involves a spindle and a rim supporting arm or arms thereon which, when removed, adapt the spindle to carry an extra wheel or wheels. As another important feature, the invention involves, with the elements above noted, the rim or tire clamping plates preferably of disk-like concavo-convex form and serve to close the sides of the rim or wheel, as the case may be, and assist in holding the same in respect to the spindle.

The invention also involves other minor, but important features which will be hereinafter described and illustrated in the drawings. In the accompanying drawings like characters indicate like parts throughout the several views.

Referring to the drawings,

Figure 1 is a view in face elevation with some parts broken away showing the improved carrier and a tire-equipped rim carried thereby;

Fig. 2 is a vertical section taken approximately on the line 2—2 of Fig. 1;

Fig. 2ᵃ is a fragmentary section on the same line as Fig. 2, but illustrating an arrangement in which the tire clamping plates hold a flexible tire cover in position on the tire of the demountable rim;

Fig. 3 is a perspective view of the inner or so-called back plate, showing a parcel carrier applied thereto;

Fig. 4 is a perspective view of the spindle and bracket that supports the same from the vehicle and the arm which projects therefrom to support the demountable rim;

Fig. 5 is a view partly in side elevation and partly in section and with some parts indicated by dotted lines illustrating a somewhat modified form of the spindle and its supporting bracket;

Fig. 6 is a view corresponding to Fig. 1, but illustrating a modified form of the rim supporting arm structure of the spindle and showing also an arrangement of the spindle designed to carry two demountable rims;

Fig. 7 is a section on the line 7—7 of Fig. 6; and

Fig. 8 is a fragmentary view in radial section illustrating a slightly modified construction of the outer end of one of the arms that support the demountable rim from the spindle.

Referring to the construction illustrated in Figs. 1, 2, 3 and 4, the numeral 9 indicates a spindle supporting bracket shown as provided with a pronged base end that is rigidly clamped to a tie rod 10 that is rigidly secured to and connects the rearwardly extended portions of the side bars 11 of the automobile frame. To the upper end of the bracket 9, a horizontally projecting spindle or bolt 12 is rigidly secured, the same, as shown, having a rounded head portion 13 intermediately adjacent to the upper end of said bracket.

A demountable rim 14 of the usual or any well known construction is provided with the customary pneumatic tire 15 having the conventional charging nipple 16. To support such a demountable rim from the spindle 12, said spindle is provided with one or more radial arms. As shown in Figs. 1, 2 and 4, there are but one of these arms indicated by the numeral 17, and this arm has a split hub 18 that engages the spindle and is firmly, but preferably detachably connected thereto by bolts or machine screws 19. At its free upper end, the rim supporting arm 17 has a laterally and outwardly extended bearing flange 20 that directly engages the inner surface of the upper portion of the rim 14 and directly supports the same. Preferably, this flange 20 is slotted or bifurcated, so that the nipple 16 of the tire 15 may be passed therethrough.

A pair of reversely bulged concavo-convex disk-like clamping plates are applied on the spindle 12, the one inward and the other outward of the arm 17. The inner or so-called back plate is indicated by the numeral 21 and the outer or so-called front plate is indicated by the numeral 22. These plates are preferably formed with reinforcing central portions in the form of thin cast shells 21$^a$ and 22$^a$, respectively. Also, in this preferred arrangement, the central portion 21$^a$ of the back plate is formed with a concave socket 23 that fits the rounded head 13 of the spindle 12 and mounts the back plate for a slight universal wabbling movement on the spindle, so that it will readily adapt itself to engagement with the demountable rim or the tire thereof.

The spindle 12 has a threaded outer end that is passed through the reinforcing central portion 22$^a$ of the front plate, and working on this threaded end of the spindle is a nut-acting clamping head 24 shown as provided with an arm 25 by means of which it may be rotated. The inner end of this clamping head 24 is preferably rounded for engagement with a concave socket 26 formed at the hub of the reinforcement 22 of the front plate. Thus the back and front clamping plates 21 and 22 are so mounted that they will adapt themselves to the form and position of the rim or tire and exert equal pressure thereon at all circumferential points.

When the demountable rim is without the tire the clamping plates 21 and 22 are directly engaged therewith and hold the same in position, but they have such radial projection from the spindle that when the tire is applied to the demountable rim they will engage the sides of the tire. Thus, it will be seen that the so-called clamping plates serve to hold the demountable rim whether with or without a tire section in position and against wabbling or rattling, but with the weight thereof carried chiefly on the radial supporting arm 17. Also, the said plates afford an inclosing receptacle which closes the space within the rim and affords a space that is adapted to be utilized for carrying parcels, or the like.

To properly utilize the space between the clamping plates, a suitable parcel carrier is applied thereon; and preferably this parcel carrier is in the form of a woven wire basket 27, one side of which is omitted, and that side directly secured to the lower portion of the back plate 21. Thus the parcel carrier or basket is, in the arrangement shown, directly supported from the back plate, but indirectly supported from the spindle. In fact, the front side of the basket is shown as provided with a hole afforded by the attached reinforcing ring 28 that is slipped over the spindle. Obviously, in applying the basket and back plate to the spindle or for removing either from the spindle, the arm 17 must be loosened on the spindle so that it will slide off from or onto the spindle.

The carrier described is adapted to be readily converted into one that will carry an extra wheel, but to do this, the arm 17 must be removed from the spindle and, of course, the basket 27 must be omitted or removed.

Of course, to adapt the spindle 12 to carry wheels having large hubs, auxiliary spindle devices, such as disclosed in my said companion application may be employed.

When it is desired to cover the outer or threaded portion of the tire, this may be done by employing a flexible cover 29 (see Fig. 2$^a$) applied over the tire and having its flaps interposed between the sides of the tire and rims of the clamping plates 21 and 22. Thus the clamping plates, in addition to functions previously described, are adapted to hold the flexible tire cover firmly in position around the tire. It is also important to note that the peripheral portions of the clamping plates 21 and 22 project radially outward beyond the rim 14 but are located inward of the greatest transverse cross section of the tire so that they will clamp the tire on its inwardly converging surface. This is important, first, because it seats the rims of the clamping plates on the inwardly converging portion of the tire and thereby assists in centering the tire in respect to the plates; and in the second place, when the tire cover is employed this arrangement provides means whereby, when the plates are tightened against the cover, they will pull the cover taut by crowding the edges thereof inward on the tire.

Fig. 5 illustrates a modification in which the spindle 12$^a$ is made integral with a reinforcing center 21′ of the back plate 21. The said center 21′ is bolted, or otherwise, rigidly secured to a supporting bracket 9$^a$ which is not only held on the cross rod 10, but is bolted to the transverse rear bar 11$^a$ of the automobile frame.

Figs. 6 and 7 illustrate a modification or extension of the construction illustrated in Figs. 1, 2, 3 and 4, whereby two demountable rims may be carried on the spindle but dispenses with the parcel carrying basket and employs three arm structures for supporting the demountable rims from the spindle. In this arrangement in Figs. 6 and 7, the elements 9, 12, 21, 22 and 24 are the same as in Figs. 1, 2, 3 and 4, but to the threaded end of the main spindle 12 is attached a supplemental or extension spindle 30. This supplemental spindle 30 has a threaded socket that is adapted to be screwed onto the threaded end of the main spindle 12 and, at its projecting end it has threads that are duplicates of the threads on the ends of said spindle 12. Hence, the clamping head 24 is adapted to be screwed onto the threaded end of the supplemental spindle 30, as well as onto the end of the said spindle 12, and moreover, the front plate 22 is adapted to be slipped onto the said supplemental spindle. Preferably, and as shown, the reinforcing center 23 of the back plate has a lug 31 that engages a notch 32 in the head of the supporting bracket 9 to prevent rotation of the back plate 21.

The three-armed rim supporting brackets 33 have hubs 34 that adapt them to be slipped onto the main spindle 12, and preferably, said hubs are slit at 35 to make them slightly contractible so that they may be firmly clamped on the spindle by means of nut-equipped bolts 36 (see particularly Fig. 6). Here it may be also stated that the internally threaded end of the supplemental spindle 30 is preferably, likewise, split and adapted to be contracted onto the threads of the spindle 12 by means of nut-equipped bolt or machine screw 37 (see Fig. 7). At their outer ends, the arms of the brackets 33 are provided with projecting flanges 38 onto which the rims are adapted to be telescopically slipped. The rims 14 are provided with the customary inwardly pressed circumferentially extended rims 14ª. The rib 14ª of the inner or right hand member 14 engages the projecting ends of the flanges 38 and limits the movement of the inner demountable rim toward the right or toward the back plate 21. Hence, the inner bracket 33 may be so set that under pressure produced by tightening the clamping rib 14 against the outer plate, the inner tire will be pressed but lightly against the rim of the back plate 21 and further pressure will be resisted by said bracket 33. This permits the inner or back plate 21 to be made of a lighter and weaker structure than the front or outer plate. This is important because it is desirable to have the supporting spindle as short as possible and this result can be attained only by giving the back plate less concavity than the front plate.

Fig. 8 shows a slight modification in which the arms of the brackets 33, at the inner or rear extremities of their flanges 38, are provided with projecting stop lugs 33' that engage the inner edge of the inner demountable rim 14.

The carrier shown in Figs. 6 and 7 is adapted to be quite easily converted into one that is adapted to carry two extra wheels. It requires, of course, that the brackets 33 be removed and would require some such form of supplemental or extension spindle and auxiliary spindle devices that are illustrated in my companion application. However, this re-arrangement will be made by the purchasing of very few parts, inasmuch as the bracket 9, the main spindle 12, the clamping plates and clamping nut may all be employed. When the device is used to carry extra wheels, the clamping plates serve to employ the rim spoke and hub structures of the wheels. Of course, if the tire or tires either of rims or wheels are deflated, the clamping plates will be forced against the rims by tightening of the clamping nut on the spindle so that even in that event, the rims of the wheels will be firmly held by the clamping plates with the weight thereof carried chiefly on the spindle.

To provide for the above described wabbling or self-seating action of the clamping plates against the rim or tire, the hole passages thereof, through which the spindle is passed, should be made slightly larger than the spindle.

What I claim is:

1. A carrier for demountable rims comprising inner and outer clamping plates, means for supporting a tire-equipped rim between said plates, means for supporting said clamping plates from a vehicle independently of the rim and for forcing said outer plate toward said back plate to clamp the same against the tire, the rims of said clamping plates being extended radially outward beyond the wheel rim but terminating inward of the greatest transverse cross section of the tire so that the rims of said plates will engage the tire on its inwardly converging surfaces.

2. A carrier for demountable rims comprising inner and outer clamping plates mounted for limited universal wabbling movements to seat themselves against an interposed rim or tire thereof, a bracket interposed between said clamping plates for supporting a demountable rim and a bolt connecting the central portions of said plates and provided with means for clamping the same against a demountable rim or the tire thereof.

3. A carrier of the kind described comprising inner and outer clamping plates and means for supporting the same and for forcing the one toward the other, and a flexible cover which, when extended over a tire interposed between said plates, is clamped against said tire by the marginal portions of said clamping plates.

4. A carrier for demountable rims comprising inner and outer clamping plates, a bracket interposed between said plates for supporting a demountable rim between said plates, the said clamping plates projecting beyond the rim so that they will engage the sides of a tire carried thereby, a flexible tire cover which, when applied around the tire is interposed between the sides of the tire and the margins of said clamping plates, and means for clamping the said plates against the tire.

5. A carrier for demountable rims comprising inner and outer clamping plates, means independent of said clamping plates for supporting a demountable rim between said plates, means for forcing the outer plate toward said back plate, and a parcel carrier mounted in the space between said clamping plates.

In testimony whereof I affix my signature in presence of two witnesses:

EMIL R. DRAVER.

Witnesses:
CLARA DEMAREST,
BERNICE G. BAUMANN.